United States Patent
Lang et al.

(10) Patent No.: US 9,205,802 B1
(45) Date of Patent: Dec. 8, 2015

(54) HYBRID INFLATOR DEVICE FOR A PASSIVE RESTRAINT AIR BAG SYSTEM

(71) Applicant: Autoliv ASP, Inc., Ogden, UT (US)

(72) Inventors: Gregory J. Lang, Ogden, UT (US); Kenneth J. Clark, Mountain Green, UT (US)

(73) Assignee: AUTOLIV ASP, INC., Ogden, UT (US)

( * ) Notice: Subject to any disclaimer, the term of this patent is extended or adjusted under 35 U.S.C. 154(b) by 0 days.

(21) Appl. No.: 14/459,411

(22) Filed: Aug. 14, 2014

(51) Int. Cl.
 *B60R 21/272* (2006.01)
 *B60R 21/268* (2011.01)
(52) U.S. Cl.
 CPC ............. *B60R 21/272* (2013.01); *B60R 21/268* (2013.01)
(58) Field of Classification Search
 CPC ........................... B60R 21/272; B60R 21/268
 USPC ........................................................ 280/737
 See application file for complete search history.

(56) References Cited

U.S. PATENT DOCUMENTS

| 5,660,412 | A  | * | 8/1997 | Renfroe et al. | 280/737 |
| 5,788,275 | A  | * | 8/1998 | Butt et al. | 280/737 |
| 7,887,091 | B1 | * | 2/2011 | Cox et al. | 280/741 |
| 8,191,927 | B2 | * | 6/2012 | Jordan et al. | 280/741 |
| 2004/0100079 | A1 | * | 5/2004 | Yamazaki et al. | 280/741 |
| 2004/0201208 | A1 | * | 10/2004 | Longhurst et al. | 280/741 |
| 2005/0062272 | A1 | * | 3/2005 | Smith et al. | 280/737 |
| 2007/0075536 | A1 | * | 4/2007 | Kelley et al. | 280/737 |

* cited by examiner

*Primary Examiner* — Faye M Fleming
(74) *Attorney, Agent, or Firm* — Harness, Dickey & Pierce, P.L.C.

(57) ABSTRACT

A hybrid inflator device for a passive restraint air bag system includes a housing defining a first chamber and a baffle passing through the first chamber. A supply of gas generant material is disposed in the first chamber and surrounds the baffle. An initiator is operative for creating a shock wave to open a burst disk and further operative to generate a hot gas to ignite the gas generant material. The initiator is disposed proximate a first end of the baffle. The baffle includes a reduced inner diameter portion and an unobstructed path extending along the length of the baffle.

24 Claims, 3 Drawing Sheets

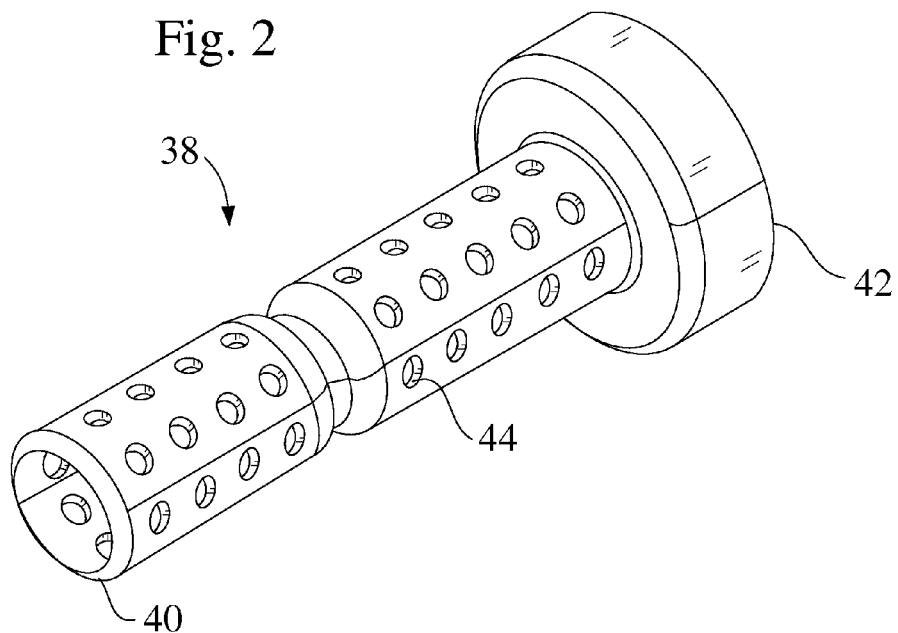
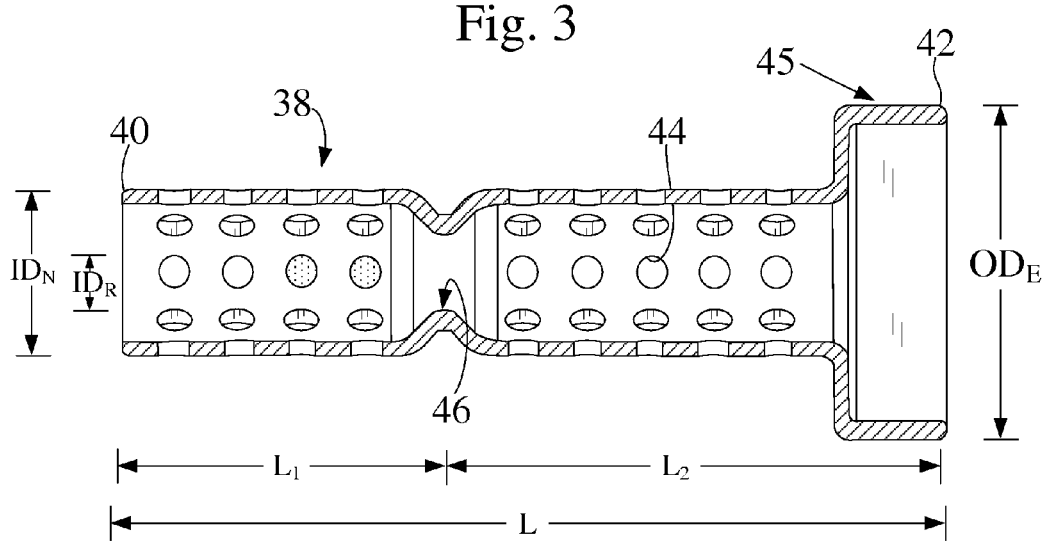

HYBRID INFLATOR DEVICE FOR A PASSIVE RESTRAINT AIR BAG SYSTEM

FIELD

The present disclosure relates to a hybrid inflator device for a passive restraint air bag system. The present disclosure more particularly relates to a hybrid inflator device for a passive air bag system having a flow restricted baffle for transmitting a shock wave and facilitating ignition of a gas generant material.

BACKGROUND

This section provides background information related to the present disclosure which is not necessarily prior art.

Passive inflatable restraint systems are used in a variety of applications, such as in motor vehicles. When a vehicle decelerates due to a collision or another triggering event occurs, an inflatable restraint system deploys an airbag cushion to prevent contact between the occupant and the vehicle to minimize occupant injuries. Airbag systems typically include an inflator that can be connected to one or more inflatable airbags positioned within the vehicle, and can rapidly produce a quantity of inflation fluid or gas that can fill the airbag(s) to protect the occupant(s). Such inflatable airbags may deploy into one or more locations within the vehicle between the occupant and certain parts of the vehicle interior, such as the doors, steering wheel, instrument panel, headliner, or the like, to prevent or avoid the occupant from forcibly striking such parts of the vehicle interior during collisions or roll-overs. In particular, driver side and passenger side inflatable restraint installations have found wide usage for providing protection to drivers and front seat passengers, respectively, in the event of head-on types of vehicular collisions. Further, side impact inflatable restraint installations have been developed to provide improved occupant protection against vehicular impacts inflicted or imposed from directions other than head-on, e.g., "side impacts." Thus, a vehicle can include an inflatable curtain airbag deployed from a headliner of the vehicle, which can inflate to protect the head of the occupant(s) from contact with the side of the vehicle, such as the windows in the event of a sudden deceleration or roll-over. One or more of such inflatable safety restraint devices can be found on most new vehicles.

One particularly common type of inflator device for an airbag system generates gas for the airbag cushion by combustion of a pyrotechnic gas generating material. Another common form or type of inflator device contains a quantity of stored pressurized or compressed gas for release into an airbag. However, such stored gas inflators are typically only useful to inflate airbags with smaller volumes. Yet another type of a compressed gas inflator is commonly referred to as a "hybrid inflator," which can supply inflation gas as a result of a combination of stored compressed gas and combustion products resulting from the combustion of a gas generating pyrotechnic material.

The use of cool burning generant formulations is becoming more popular in hybrid inflators. Such cool burning generants may allow for a reduction in the inflator length and mass. Most of these formulations have relatively low burning rates, and thereby require the use of gas generant tablets to meet the desired performance requirements. A baffle or some other structure is conventionally used to position and retain the gas generant tablets. To achieve the desired performance objectives, the baffle must provide a relatively unobstructed path for the shock wave to travel, yet allow hot gasses to reach and ignite the generant.

While known inflator devices for passive restraint air bag systems have generally proven to be acceptable for their intended uses, a continuous need for improvement exists in the relevant art.

SUMMARY

This section provides a general summary of the disclosure, and is not a comprehensive disclosure of its full scope or all of its features.

To improve performance characteristics, the inflator device of the present disclosure generally may include a baffle having an inner diameter sufficiently large enough to capture and funnel a pressure wave released from a pressure dome. The baffle may also allow hot gasses from an initiator to reach and ignite gas generant tablets retained by the baffle. The baffle includes holes sized to retain the generant tablets and resulting generant slag. The baffle may be placed in close proximity to the pressure dome to minimize any back flow of gasses into the space between the baffle and the pressure dome. When the pressure dome opens, a slight funnel may form for directing the gasses into the baffle. A flow restriction may be incorporated into the baffle to improve the ignition of the generant and performance of the inflator.

In accordance with one particular aspect, the present teachings provide a hybrid inflator device for a passive restraint air bag system. The hybrid inflator device includes a housing defining a first chamber and a baffle passing through the first chamber. A supply of gas generant material is disposed in the first chamber and surrounds the baffle. An initiator is operative for creating a shock wave to open a burst disk and further operative to generate a hot gas to ignite the gas generant material. The initiator is disposed proximate a first end of the baffle. The baffle includes a reduced inner diameter portion and an unobstructed path extending along the length of the baffle.

In accordance with another particular aspect, the present teachings provide a hybrid inflator device for a passive restraint air bag system. The hybrid inflator device includes a housing, a baffle disposed in the housing, and a gas generant material surrounding the baffle. A ring retains the gas generant material in an axial direction. A spring biases the ring toward the gas generant material. A spring retainer retains the spring.

In accordance with yet another particular aspect, the present teachings provide a hybrid inflator device for a passive restraint air bag system. The hybrid inflator device includes a generally cylindrical housing having a first end and a second end. The housing defines a first chamber containing a gas generant material and a second chamber containing a pressurized gas. A baffle passes through the first chamber such that the gas generant material surrounds the baffle. The baffle includes a reduced inner diameter portion and a unobstructed path extending along the length of the baffle. An initiator is disposed in the housing proximate the first end. The initiator is operative to create a shock wave to open a burst disk and further operate to generate a hot gas to ignite the gas generant material. The hybrid inflator device further includes a ring for retaining the gas generant material, a spring biasing the ring toward the gas generant material, and a spring retainer for retaining the spring.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2 is a perspective view of a baffle of the hybrid inflator device of the present teachings.

FIG. 3 is a cross-sectional view taken along the line 3-3 of FIG. 2.

Corresponding reference numerals indicate corresponding parts throughout the several views of the drawings.

DETAILED DESCRIPTION

Example embodiments will now be described more fully with reference to the accompanying drawings.

An example embodiment is provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that the example embodiment should not be construed to limit the scope of the present disclosure. Well-known processes, well-known device structures, and well-known technologies are not described herein in detail.

Figure 1:
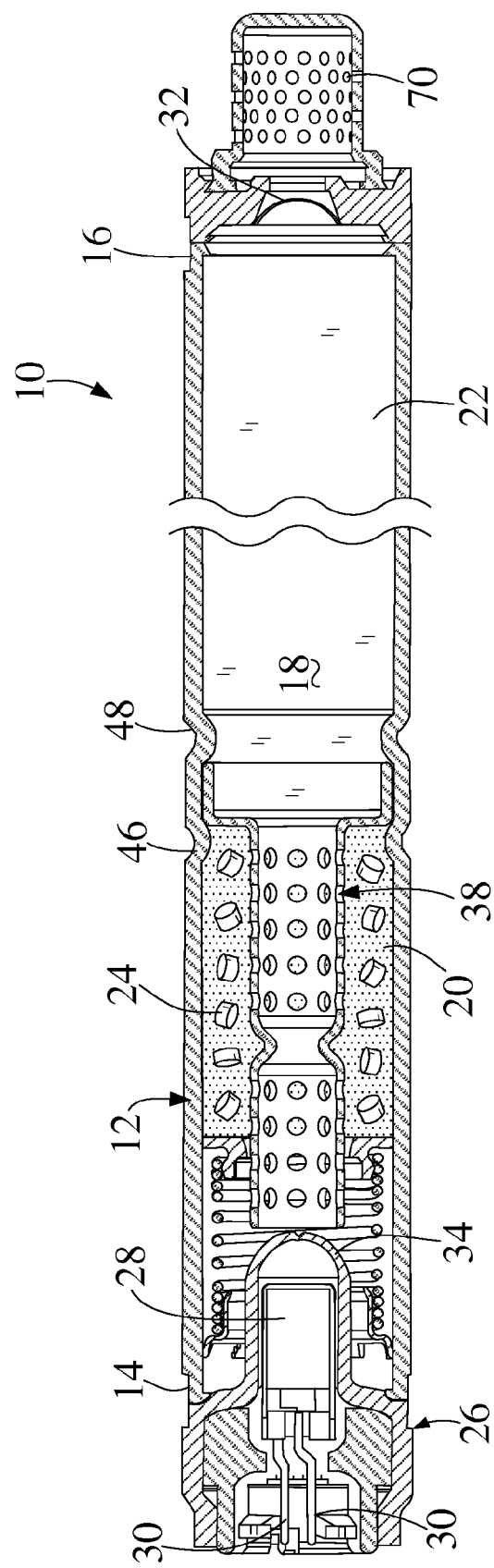
FIG. 1 is a sectional view of a hybrid inflator device in accordance with the present teachings.

With initial reference to FIGS. 1-3, a hybrid inflator device for a passive restraint air bag system in accordance with the present teachings is shown and generally identified at reference character 10.

In the embodiment illustrated, the inflator device 10 is a hybrid inflator device. In this regard, the inflator device 10 functions to deliver inflation gases to a passive restraint air bag system (not particularly shown) that are the result of a combination of stored compressed gas and combustion products from combustion of a gas generating pyrotechnic material. In one particular application, the inflator device 10 may be used to inflate a side air bag of a motor vehicle. It will be understood, however, that the present teachings are not limited thereto.

The inflator device is illustrated to generally include a housing 12. The housing 12 has a first end 14 and an opposite second end 16. As illustrated, the housing 12 may be tubular in shape and may define an internal cavity 18. As will be further understood below, the internal cavity 18 may be considered to include a first chamber 20 and a second chamber 22. A supply of gas generant material 24 may be stored in the first chamber 20. A supply of pressurized gas may be stored in the second chamber.

An initiator assembly 26 having an initiator 28 is carried at the first end 14 of the housing 12. A pair of electrical conductive pins 30 extend from the initiator 28. The initiator 28 is conventional in construction and operation insofar as the present teachings are concerned. In this regard, the initiator 28 includes an initiator pyrotechnic material and is operative to create a shock wave for opening a temporary closure, device such as a burst disk 32, proximate the second end 16 of the housing 12. The initiator assembly 26 may further include a pressure dome 34. In the embodiment illustrated, the initiator assembly 26 is inertia welded to the housing 12 in a manner well known in the art.

The inflator device 10 is further illustrated to include a baffle 38. An enlarged view of the baffle 38 is shown in FIG. 2. FIG. 3 is an enlarged cross-sectional view of the baffle 38. The baffle 38 is at least primarily disposed in the first chamber 20 such that the gas generant material 24 surrounds the baffle 38.

The baffle 38 may be tubular in shape and includes a first end 40 and a second end 42. The baffle 38 may include a plurality of holes 44 substantially along the length thereof. The plurality of holes 44 may facilitate the transfer of the hot gas generated by the initiator 28 to the gas generant material 24. The holes are sized to retain the gas generant material and resulting slag.

The baffle 38 has a nominal inner diameter $ID_N$. Proximate the second end 42, the baffle 38 may include an enlarged diameter portion 45 having an enlarged outer diameter $OD_E$. In the embodiment illustrated, the baffle 38 is further illustrated to include a reduced inner diameter portion 46 having a reduced inner diameter $ID_R$. In one particular embodiment, the nominal inner diameter $ID_N$ is approximately 9 mm, the reduced inner diameter $ID_R$ is approximately 5.5 mm and the enlarged outer diameter $D_E$ is approximately 21 mm. In this particular embodiment, the baffle 38 includes a length L of approximately 45 mm. Preferably, the reduced inner diameter $ID_R$ is greater than 50% of the nominal inner diameter $ID_N$. It will be understood that the dimensions provided herein are exemplary and may be modified for particular uses within the scope of the present teachings.

As shown particularly in the cross-sectional view of FIG. 3, the length L of the baffle 38 may be divided into a first length from the first end 40 to the reduced inner diameter $ID_R$ portion and a second length from the reduced inner diameter $ID_R$ portion to a second end 42 of the baffle 38. In the embodiment illustrated, the first length $L_1$ may be approximately 21 mm and the second length $L_2$ may be approximately 24 mm. Importantly, the second length $L_2$ is greater than the first length $L_1$. Further importantly, a majority of the gas generant material is located downstream from the reduced inner diameter portion 46.

The enlarged diameter portion 45 may be captured by the housing 12 to fix the position of the baffle 38 within the housing 12. As shown in the cross-sectional view of FIG. 1, the housing 12 may be formed to include first and second crimps 46 and 48 on opposite axial sides of the enlarged diameter portion 45. Since the enlarged outer diameter $OD_E$ approaches the nominal inner diameter $ID_N$ of the housing 12, the housing 12 functions to radially and axially fix the baffle 38 relative to the housing.

The gas generant material 24 surrounds the baffle 38 and is radially positioned and retained by the baffle 38 prior to ignition. In the embodiment illustrated, the gas generant material 24 include a plurality of gas generant tablets. Alternatively, it will be understood that the gas generant materials 24 may include a monolithic grain.

Figure 4:
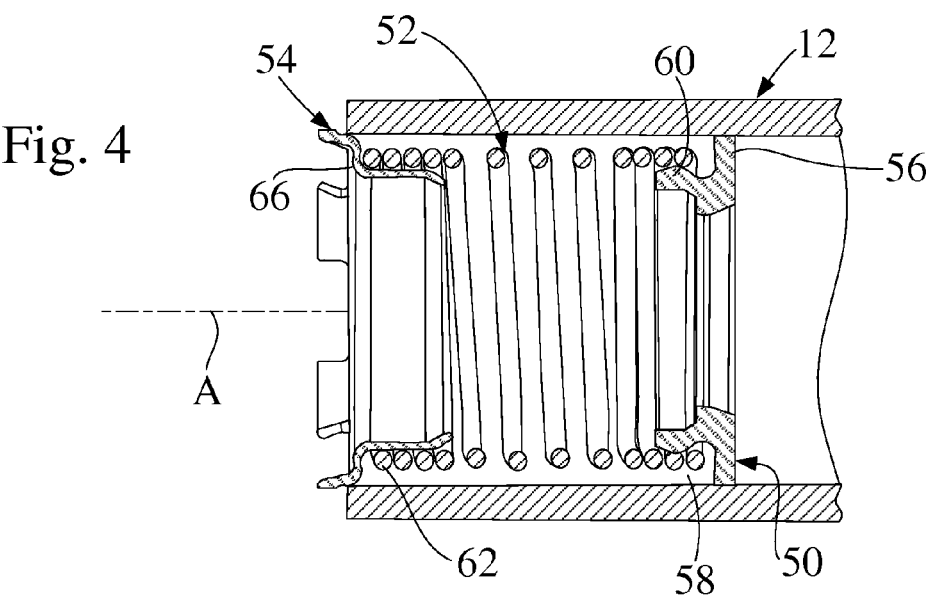
FIG. 4 is a cross-sectional view of an end of the hybrid inflator device illustrated as a spring retainer, spring and gas generant ring are inserted into the housing as a unit.
Figure 5:
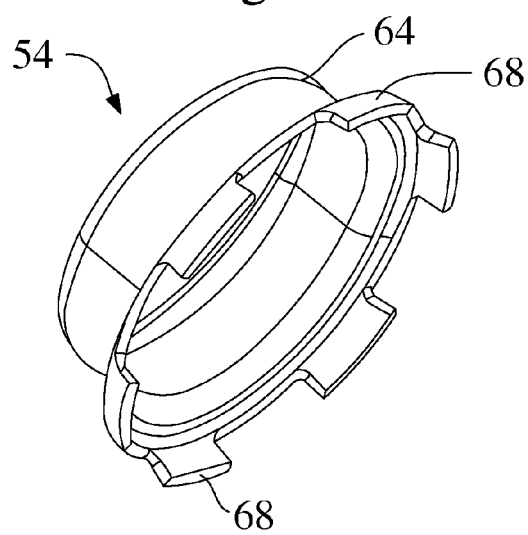
FIG. 5 is a perspective view of the spring retainer of the inflator device in accordance with the present teachings.
Figure 6:
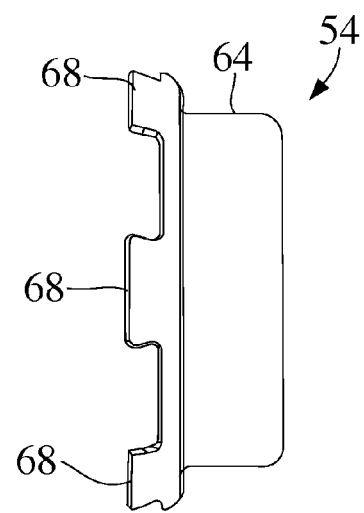
FIG. 6 is a side view of the spring retainer of the inflator device in accordance with the present teachings.

With particular reference to FIG. 1 and further reference to FIGS. 4 through 6, the inflator device 10 is further illustrated to include a generant retaining ring 50, a spring 52 and a spring retainer 54. FIG. 4 is a cross-sectional view showing the gas generant retaining ring 50, the spring 52 and the spring retainer 54 upon insertion into the housing 12 as a unit. FIGS. 5 and 6 are further views of the spring retainer 54.

For most inflator devices, a pressure dome or similar component would be used to compress a spring for holding the gas generant material in place. With inertia welded devices, this is not practical since the spinning base dome would cause the gas generant and other components to spin during welding.

The generant retaining ring 50 circumferentially surrounds the baffle 38. As illustrated, the generant retaining ring 50 includes a radially extending flange 56. The flange 56 abuts, retains and biases the gas generant material 24.

The spring 52 may be a coil spring. A first end 58 of the coil spring 52 may circumferentially surround an axially extending portion 60 of the generant retaining ring 50. A second end 62 of the coil spring 52 may circumferentially surround a solid cylindrical portion or axially extending portion 64 of the spring retainer 54.

The spring retainer 54 may be formed of a high tensile strength steel or spring steel. As illustrated, the spring retainer 54 may include a radially extending portion 66 and a plurality of retaining members or tabs 68. The tabs 68 may extend from the radially extending portion 66 at an angle relative to a longitudinal axis A of the housing 12. In an uncompressed state, the tabs 68 create an interference fit with the nominal inner diameter $ID_N$ of the housing 12. In this manner, low insertion forces are required as the tabs 68 easily spring inward during installation. Although the insertion forces are low, the extraction forces are high due to the tabs 68 pushing outward into the housing 12. Another advantage to the present design is an ability to accommodate a large variation in the tolerance of the nominal inner diameter $ID_N$ of the housing 12. These advantages make the present teachings more desirable than a solid ring press fit into the inner diameter of the housing. The solid cylindrical portion 64 of the spring retainer 54 that interfaces with the spring 52 can be designed to have a slight press fit with an inner diameter of the spring 52. This allows the generant retainer 50 to be easily installed into the inflator device 10 as an assembly.

Upon receiving an electric charge signal in response to a crash or pending crash, for example, the initiator generates a hot gas. The hot gas opens the pressure dome 34 and ignites the gas generant material. The first end 40 of the baffle 38 is in close proximity to the pressure dome 34 of the initiator assembly 26 so as to minimize any back flow of gasses into a space between the baffle 38 and the pressure dome 34. When the pressure dome 34 opens, a slight funnel is formed that directs gasses into the baffle 38. While not beyond the scope of the present teachings, the open dome 34 is not designed to contact the baffle 38 to form a pressure seal therewith.

When the pressure dome 34 opens, a resulting pressure wave travels along the length of the baffle 18, through the storage of pressurized gas in the second chamber 22 and to the burst disk 32. The shock wave opens the burst disk 34. A combination of stored compressed gas and combustion products resulting from combustion of the gas generant material 24 are released through a diffuser 70 and into an inflatable airbag cushion.

The reduced diameter portion 46 of the baffle 38 provides a flow restriction while maintaining an unobstructed path that extends along the entire length of the baffle 38. The flow restriction improves ignition of a gas generant material 24 and the ultimate performance of the inflator device 10. In this regard, the reduced inner diameter IDR impedes axial flow of a portion of the hot gases along the baffle 18 and directs this portion of the hot gases to a proximal portion of the gas generant material 24. This extra heat at the proximal portion of the gas generant material more quickly ignites the gas generant material. To minimize dissipation of energy from the shock wave, the flow restriction is minimized.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A hybrid inflator device for a passive restraint air bag system, the hybrid inflator device comprising:
a housing defining a first chamber;
a baffle passing through the first chamber;
a supply of gas generant material disposed in the first chamber; and
an initiator for creating a shock wave to open a burst disk and generating a hot gas to ignite the gas generant material, the initiator disposed proximate a first end of the baffle;
wherein the baffle includes a first length from the first end to a reduced inner diameter portion and a second length from the reduced inner diameter portion to a second end of the baffle, the second length being greater than the first length, the baffle defining an unobstructed path extending along the first length and the second length.

2. The hybrid inflator device of claim 1, wherein the gas generant material includes a plurality of gas generant tablets.

3. The hybrid inflator device of claim 2, wherein the baffle positions and retains the plurality of gas generant tablets prior to ignition thereof.

4. The hybrid inflator device of claim 1, wherein the baffle is perforated for facilitating ignition of the gas generant material with the hot gas.

5. The hybrid inflator device of claim 1, wherein the reduced inner diameter portion of the baffle is greater than 50% of a nominal inner diameter of the baffle.

6. The hybrid inflator device of claim 1, further comprising:
a ring for retaining the gas generant material;
a spring biasing the ring toward the gas generant material; and
a spring retainer for retaining the spring.

7. The hybrid inflator device of claim 6, wherein the spring retainer engages an internal diameter of the housing.

8. The hybrid inflator device of claim 1, further comprising a second chamber containing a pressurized gas.

9. The hybrid inflator device of claim 1, wherein the hybrid inflator device is a hybrid inflator.

10. The hybrid inflator device of claim 1, wherein the gas generant material surrounds the baffle.

11. A hybrid inflator device for a passive restraining air bag system, the hybrid inflator device comprising:
a housing;
a baffle disposed in the housing;
a gas generant material surrounding the baffle;
a ring retaining the gas generant material in an axial direction;
a spring biasing the ring toward the gas generant materials; and
a spring retainer for retaining the spring.

12. The hybrid inflator device of claim 11, wherein the spring retainer engages an internal diameter of the housing.

13. The hybrid inflator device of claim 12, wherein the spring retainer forms an interference fit with the housing.

14. The hybrid inflator device of claim 11, wherein the spring retainer includes a main body portion and a plurality of tabs extending from the main body portion for engaging the internal diameter of the housing.

15. The hybrid inflator device of claim 14, wherein the plurality of tabs extend from the main body portion at an angle.

16. The hybrid inflator device of claim 15, wherein the plurality of tabs are adapted to inwardly flex upon the introduction of the spring retainer into the housing.

17. A hybrid inflator device for a passive restraint air bag system, the hybrid inflator device comprising:
a generally cylindrical housing having a first end and a second end, the housing defining a first chamber containing a gas generant material and a second chamber containing a pressurized gas;
a baffle passing through the first chamber such that the gas generant material surrounds the baffle, the baffle including a reduced inner diameter portion and a unobstructed path extending along the length of the baffle;
an initiator disposed in the housing proximate the first end, the initiator for creating a shock wave to open a burst disk and further operate to generate a hot gas to ignite the gas generant material;
a ring for retaining the gas generant material;
a spring biasing the ring toward the gas generant material; and
a spring retainer for retaining the spring.

18. The hybrid inflator device of claim 17, wherein the reduced inner diameter portion of the baffle is greater than 50% of a nominal inner diameter of the baffle.

19. The hybrid inflator device of claim 17, wherein the baffle includes a first length from the first end to the reduced inner diameter portion and a second length from the reduced inner diameter portion to a second end of the baffle, the second length being greater than the first length.

20. The hybrid inflator device of claim 17, wherein the spring surrounds a portion of the baffle and a portion of the initiator.

21. A hybrid inflator device for a passive restraint air bag system, the hybrid inflator device comprising:
a housing defining a first chamber;
a baffle passing through the first chamber;
a supply of gas generant material disposed in the first chamber; and
an initiator for creating a shock wave to open a burst disk and generating a hot gas to ignite the gas generant material, the initiator disposed proximate a first end of the baffle;
wherein the first end of the baffle has a first inner diameter, the baffle further including a second end having a second inner diameter and a reduced inner diameter portion disposed between the first and second ends and including a reduced inner diameter smaller than both the first inner diameter and the second inner diameter.

22. The hybrid inflator device of claim 21, wherein the reduced inner diameter portion of the baffle is greater than 50% of a nominal inner diameter of the baffle.

23. The hybrid inflator device of claim 22, wherein the initiator includes a pressure dome spaced from the baffle.

24. The hybrid inflator device of claim 22, wherein the baffle includes a reduced outer diameter portion proximate the reduced inner diameter portion.

* * * * *